(12) United States Patent
Scarlata et al.

(10) Patent No.: US 10,019,601 B2
(45) Date of Patent: Jul. 10, 2018

(54) METHOD AND APPARATUS FOR SECURELY SAVING AND RESTORING THE STATE OF A COMPUTING PLATFORM

(71) Applicant: Intel Corporation, Santa Clara, CA (US)

(72) Inventors: Vincent R. Scarlata, Beaverton, OR (US); Simon P. Johnson, Beaverton, OR (US); Carlos V. Rozas, Portland, OR (US); Francis X. McKeen, Portland, OR (US); Ittai Anati, Haifa (IL); Ilya Alexandrovich, Yokneam Illit (IL); Rebekah M. Leslie-Hurd, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/079,579

(22) Filed: Mar. 24, 2016

(65) Prior Publication Data

US 2016/0203340 A1 Jul. 14, 2016

Related U.S. Application Data

(62) Division of application No. 14/281,651, filed on May 19, 2014, now Pat. No. 9,407,636.

(51) Int. Cl.
*G06F 21/64* (2013.01)
*H04L 29/06* (2006.01)
(Continued)

(52) U.S. Cl.
CPC .............. *G06F 21/64* (2013.01); *G06F 21/62* (2013.01); *G06F 21/74* (2013.01); *G06F 21/81* (2013.01);
(Continued)

(58) Field of Classification Search
None
See application file for complete search history.

(56) References Cited

U.S. PATENT DOCUMENTS 7,165,135 B1 1/2007 Christie et al.
8,329,452 B2 12/2012 Roukes et al.
(Continued)

FOREIGN PATENT DOCUMENTS

CN 101169811 A 4/2008

OTHER PUBLICATIONS

Restriction Requirement for U.S. Appl. No. 14/281,651, dated Sep. 29, 2015, 6 pages.
(Continued)

*Primary Examiner* — Benjamin E Lanier
(74) *Attorney, Agent, or Firm* — Nicholson De Vos Webster & Elliott LLP

(57) ABSTRACT

An apparatus and method for securely suspending and resuming the state of a processor. For example, one embodiment of a method comprises: generating a data structure including at least the monotonic counter value; generating a message authentication code (MAC) over the data structure using a first key; securely providing the data structure and the MAC to a module executed on the processor; the module verifying the MAC, comparing the monotonic counter value with a counter value stored during a previous suspend operation and, if the counter values match, then loading processor state required for the resume operation to complete. Another embodiment of a method comprises: generating a first key by a processor; securely sharing the first key with an off-processor component; and using the first key to generate a pairing ID usable to identify a pairing between the processor and the off-processor component.

18 Claims, 14 Drawing Sheets

(51) Int. Cl.
  *G06F 21/62*    (2013.01)
  *G06F 21/74*    (2013.01)
  *G06F 21/81*    (2013.01)
  *G06F 21/85*    (2013.01)

(52) U.S. Cl.
  CPC ............ *G06F 21/85* (2013.01); *H04L 63/061* (2013.01); *H04L 63/0876* (2013.01)

(56) References Cited

U.S. PATENT DOCUMENTS

| | | | |
|---|---|---|---|
| 8,832,452 | B2 | 9/2014 | Johnson et al. |
| 8,972,746 | B2 | 3/2015 | Johnson et al. |
| 9,059,855 | B2 | 6/2015 | Johnson et al. |
| 9,087,200 | B2 | 7/2015 | McKeen et al. |
| 9,189,411 | B2 | 11/2015 | McKeen et al. |
| 9,276,750 | B2 | 3/2016 | Scarlata et al. |
| 2004/0170068 | A1* | 9/2004 | Williams ................ G06F 21/88 365/200 |
| 2006/0198515 | A1 | 9/2006 | Forehand et al. |
| 2006/0271796 | A1 | 11/2006 | Kaimal et al. |
| 2007/0162955 | A1 | 7/2007 | Zimmer et al. |
| 2007/0226786 | A1 | 9/2007 | Berger et al. |
| 2008/0320263 | A1 | 12/2008 | Nemiroff et al. |
| 2009/0044278 | A1* | 2/2009 | Lim ........................ G06F 21/10 726/26 |
| 2009/0158045 | A1* | 6/2009 | Sun ........................ H04L 9/304 713/181 |
| 2009/0276617 | A1* | 11/2009 | Grell ..................... G06F 21/575 713/2 |
| 2011/0099392 | A1 | 4/2011 | Conway |
| 2011/0151836 | A1 | 6/2011 | Dadu et al. |
| 2012/0159184 | A1* | 6/2012 | Johnson .............. G06F 12/1466 713/189 |
| 2014/0082724 | A1 | 3/2014 | Pearson et al. |
| 2014/0298061 | A1 | 10/2014 | Volvovski et al. |
| 2015/0039894 | A1* | 2/2015 | Ho .......................... H04B 1/38 713/176 |

OTHER PUBLICATIONS

Notice of Allowance for U.S. Appl. No. 14/281,651, dated Dec. 14, 2015, 20 pages.
Notice of Allowance for U.S. Appl. No. 14/281,651, dated Apr. 11, 2016, 9 pages.
First Office Action and Search Report from foreign counterpart China Patent Application No. 20150186144.5, dated Aug. 30, 2017, 16 pages. (Translation available only for office action).

* cited by examiner

METHOD AND APPARATUS FOR SECURELY SAVING AND RESTORING THE STATE OF A COMPUTING PLATFORM

CROSS REFERENCE TO RELATED APPLICATION

This application is a divisional application claiming priority to U.S. patent application Ser. No. 14/281,651, filed May 19, 2014, entitled "Method And Apparatus For Securely Saving And Restoring The State of A Computing Platform", all of which is hereby incorporated by reference in its entirety into this application.

BACKGROUND

Field of the Invention

This invention relates generally to the field of computer processors. More particularly, the invention relates to an apparatus and method for securely saving and restoring the state of a computing platform.

Description of the Related Art

Many modern processors do not have persistent storage on the processor in which to store state data that must be kept up to date and not reused. This is particularly relevant for security technologies such as Software Guard Extensions (SGX) where internal keys and configuration data need to be stored outside of the processor when suspending and resuming the platform for power savings.

One prior solution to this problem requires a hardware interface from the processor directly to trusted storage, which is solely owned by the processor. Securing this channel requires a key exchange in a trusted manufacturing facility protected from malicious observation of the key. This requires special hardware not typically found in a personal computing device. In addition, with increases in out-sourced off-shore manufacturing, gaining this trust is very difficult, if not impossible. In addition, flash storage may be added to the processor itself to ensure the security of the data stored during suspend operations, again resulting in significant additional manufacturing expense.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
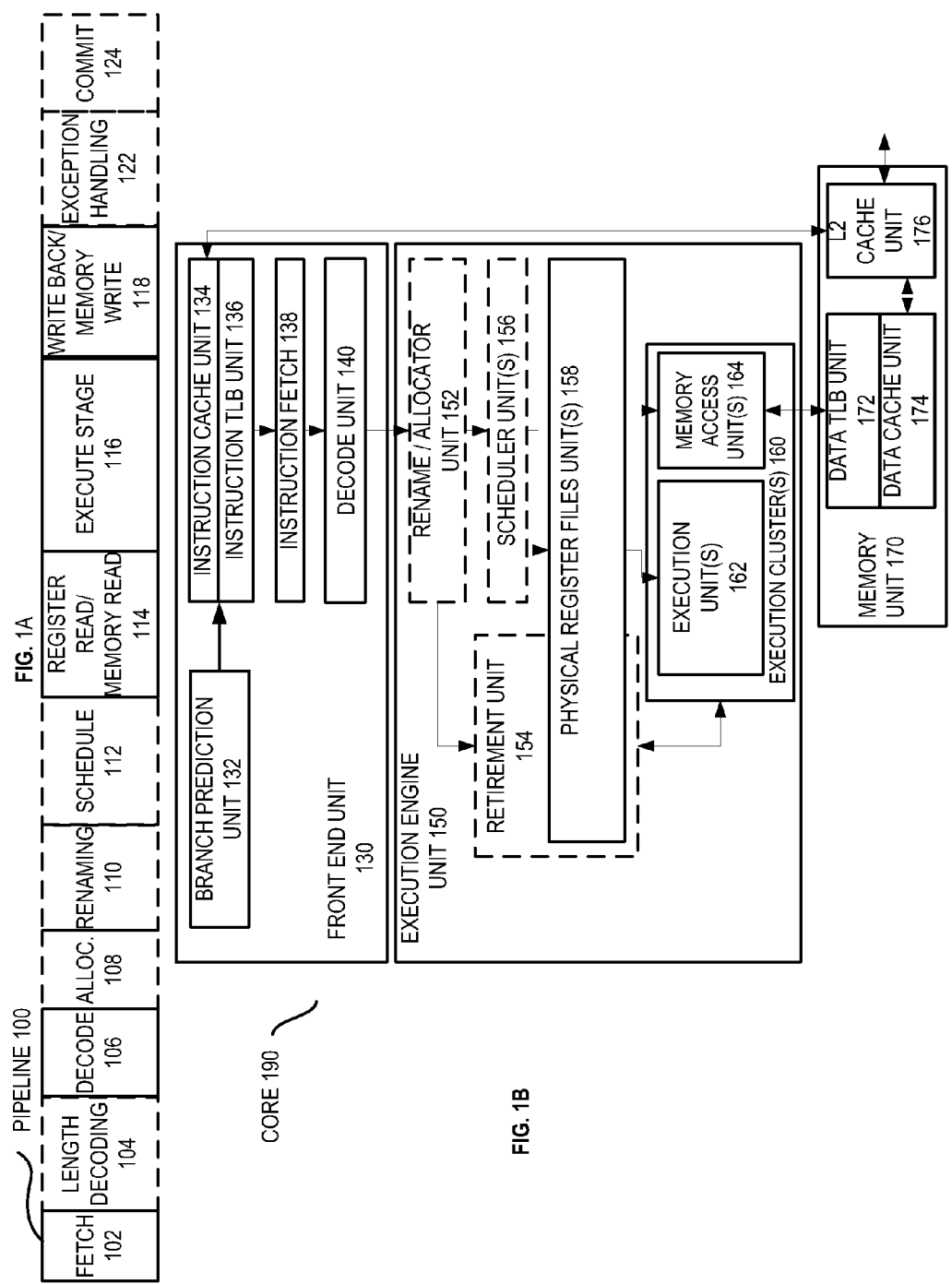
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
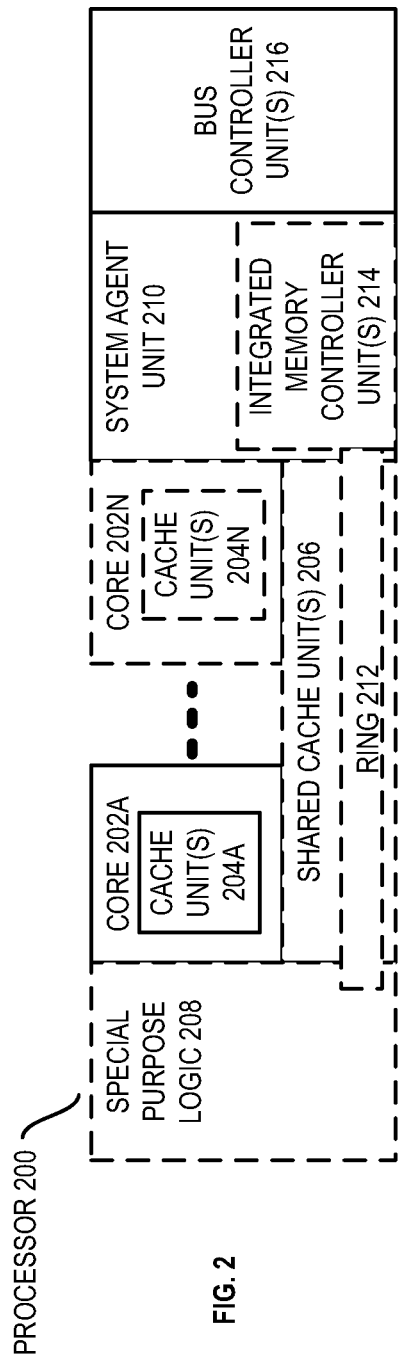
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
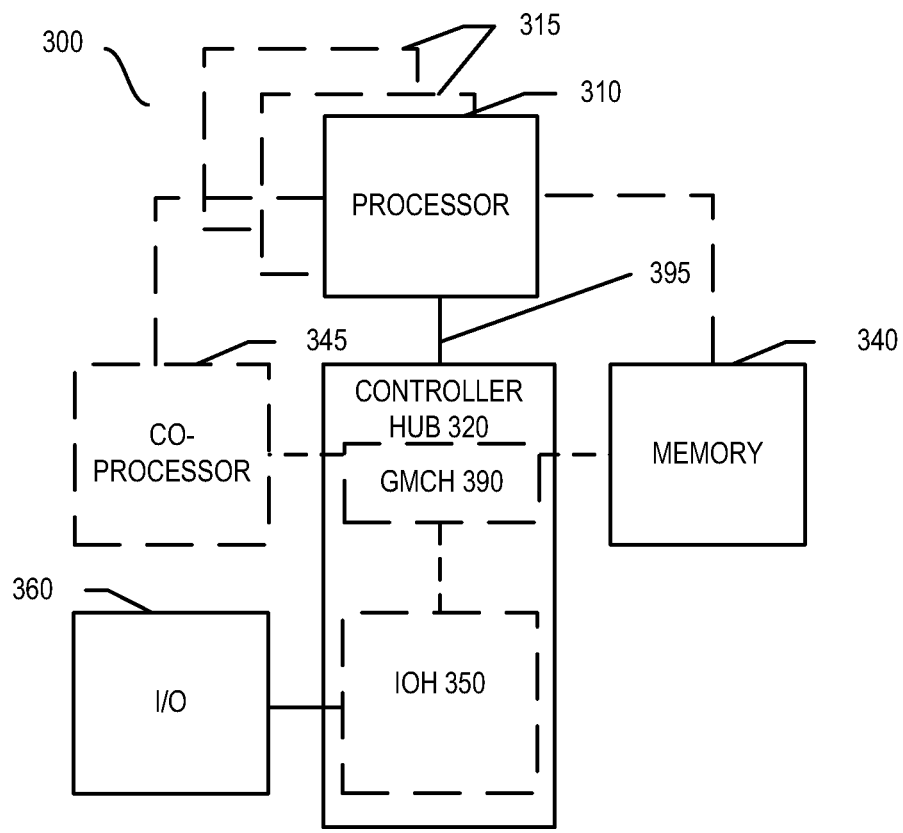
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
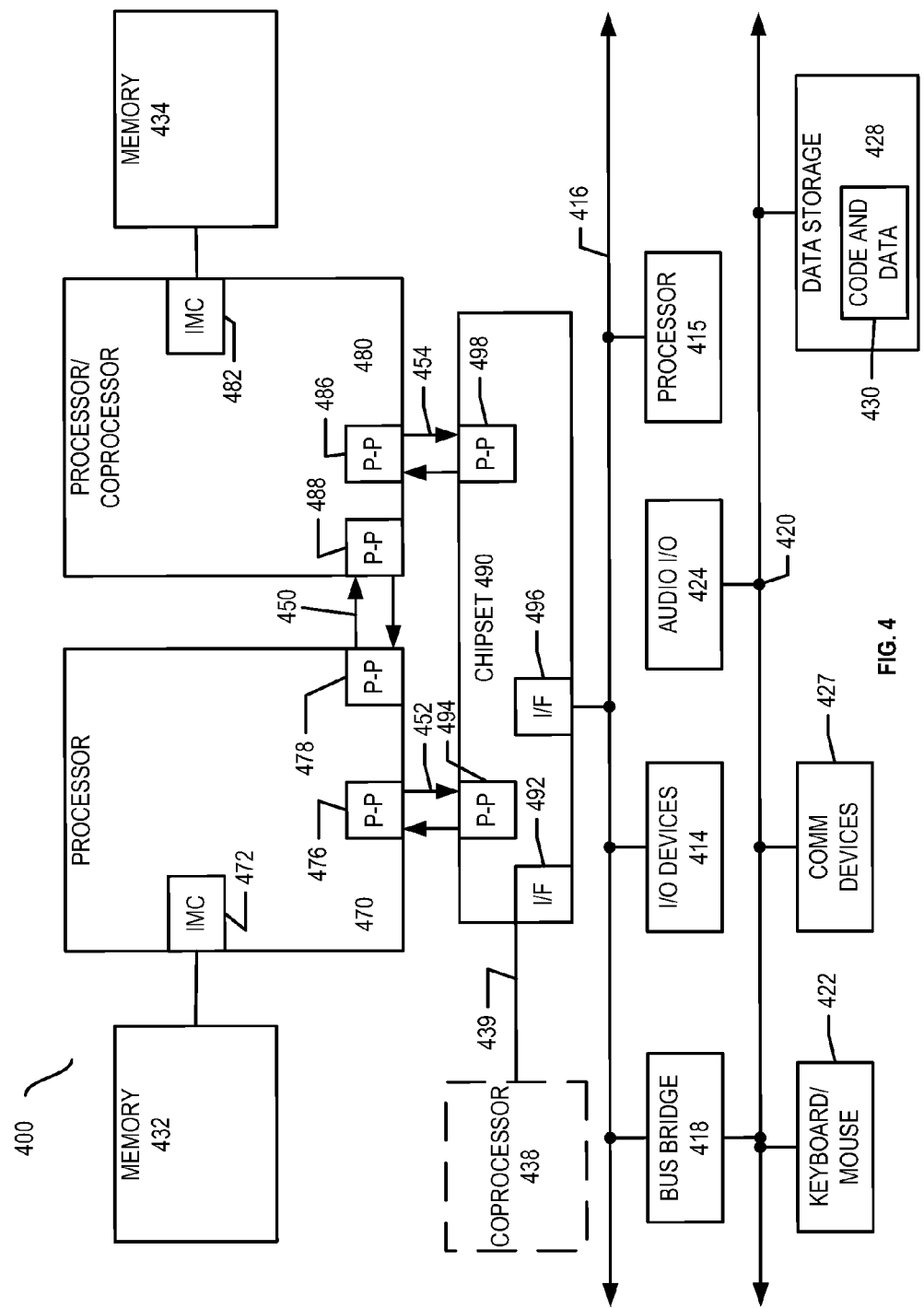
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
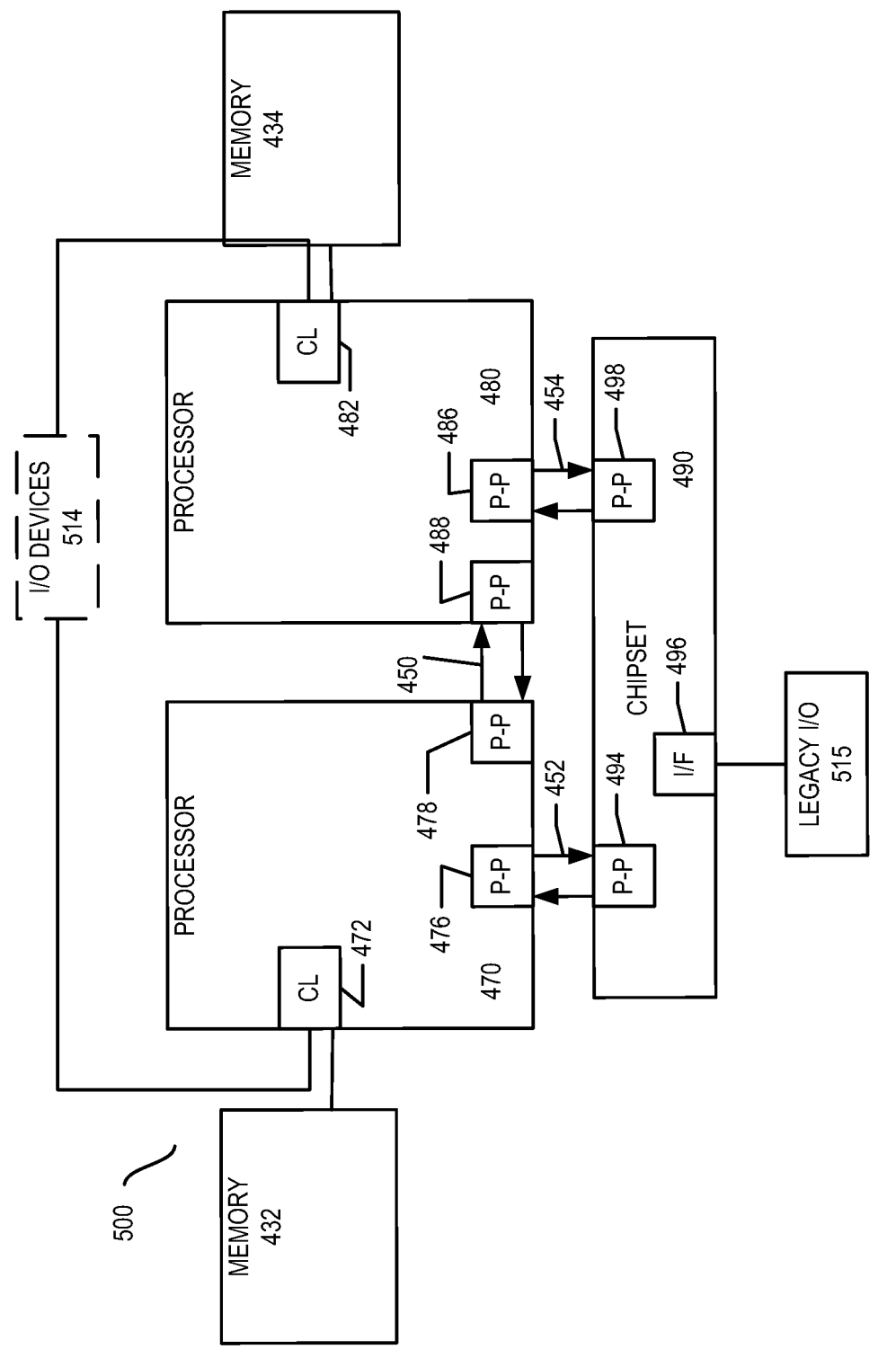
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
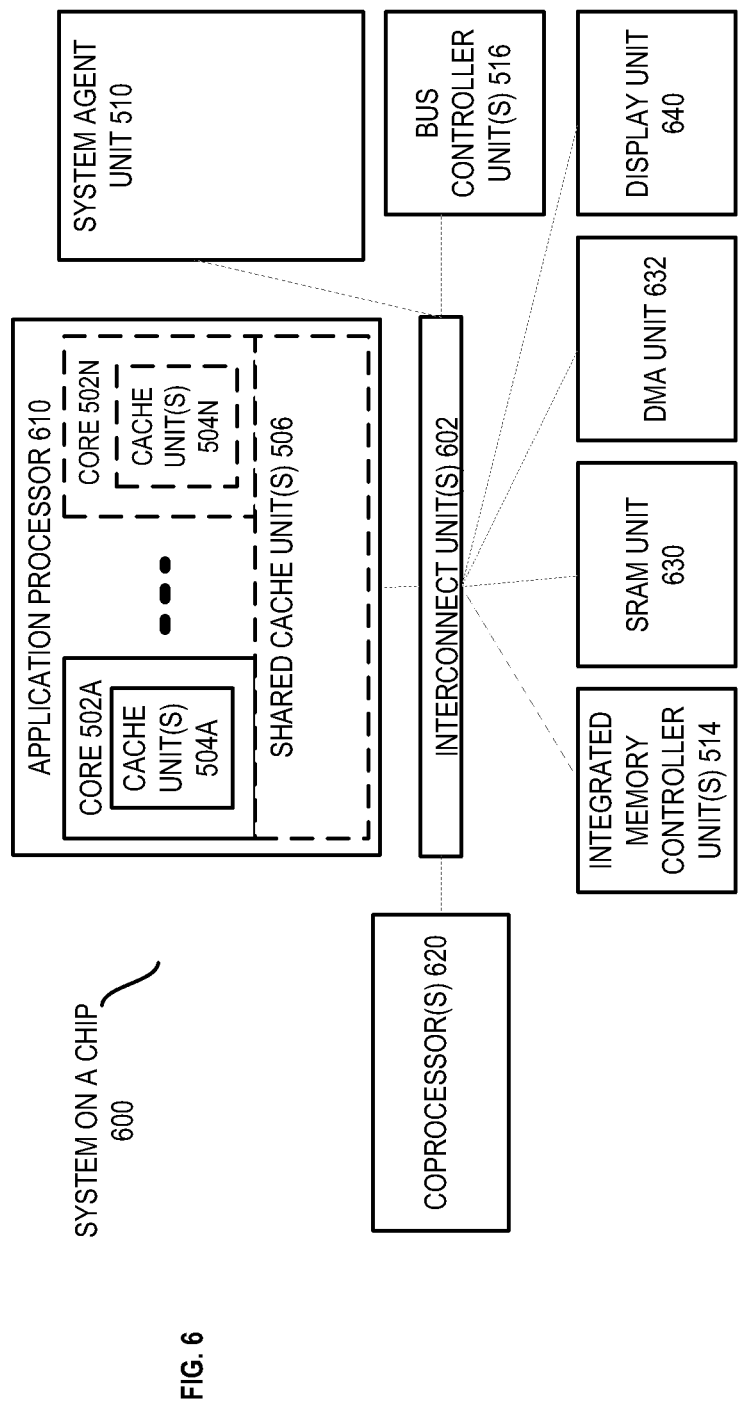
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
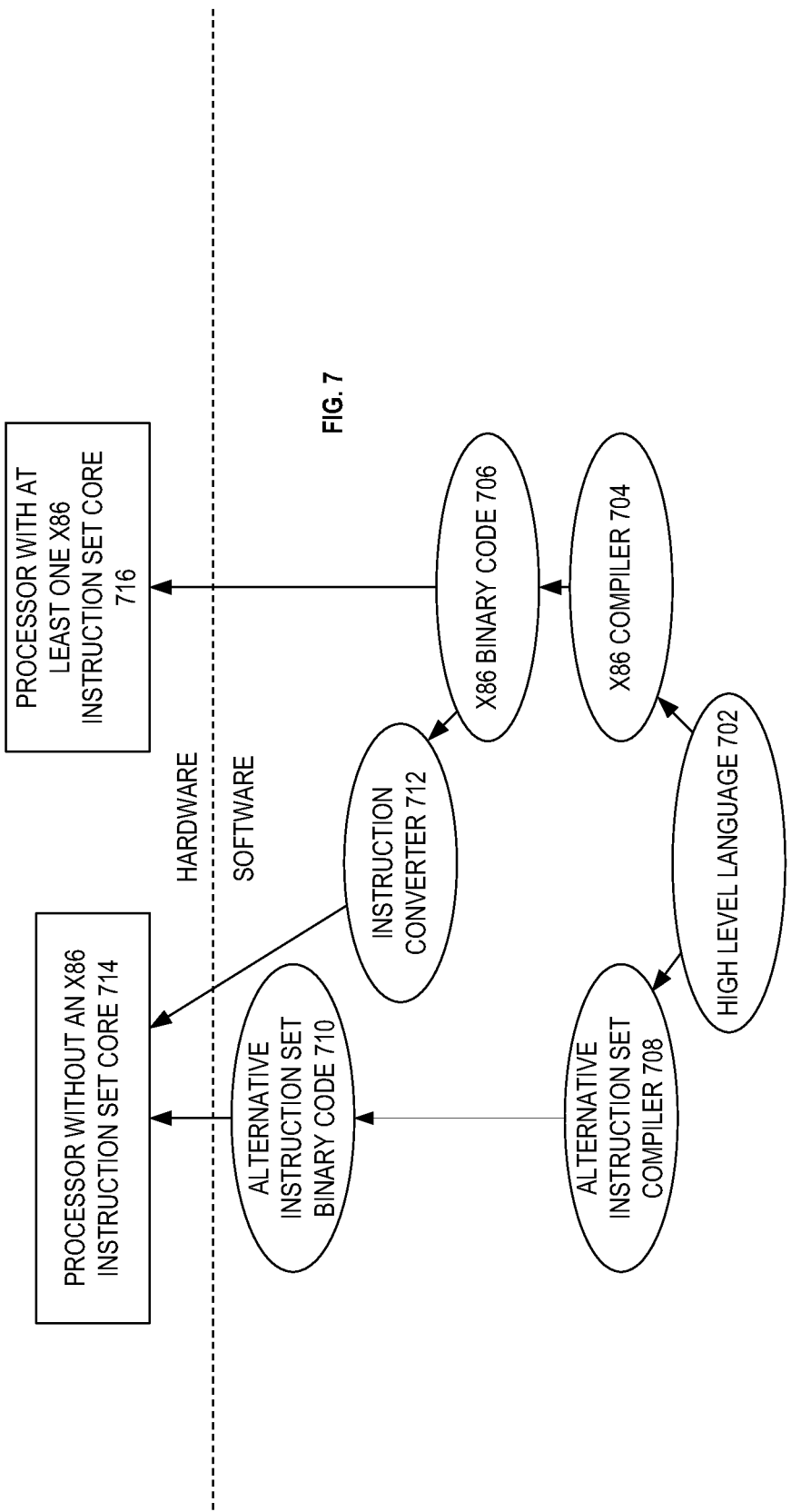
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Securely Saving and Restoring the State of a Computing Platform One embodiment of the invention uses trusted software during manufacturing to establish a secure channel between the processor and an off-processor component, such as a microcontroller, which controls an increasing monotonic counter. The secure channel results in an authentication key encrypted and stored by both devices. In one embodiment, the monotonic counter is used as a version counter for suspend/resume operations where the structure containing the current counter must be the newest (representing the most recent suspend operation), and each exported processor state includes an indication of the current counter.

In one embodiment, the pairing between the processor and off-processor component(s) is assigned a unique ID, which is registered in a database (e.g., a database maintained by the original equipment manufacturer (OEM)). The unique ID may be generated using the authentication keys generated and maintained by the paired devices. In addition, the unique ID may be used to support an additional layer of security in existing computing platforms. For example, in a Software Guard Extensions (SGX) implementation, the unique ID may be injected into all SGX keys used in the system. Consequently, if an unauthorized pairing occurs, old SGX keys become inaccessible, and the OEM will not provision new keys to the unauthorized pairing.

In one embodiment, after deployment, when restoring an exported state, the processor verifies a message from the off-processor component (e.g., the microcontroller) authenticated with the key, and ensures that the state includes the newest counter. If the counter authenticates and the state matches, the state is restored. When the machine is to be suspended, the operating system (OS) (or other software component) may call a machine status register (MSR) to output the current state along with the current counter (from boot). The SGX implementation is disabled and the OS can then power down.

Figure 8:
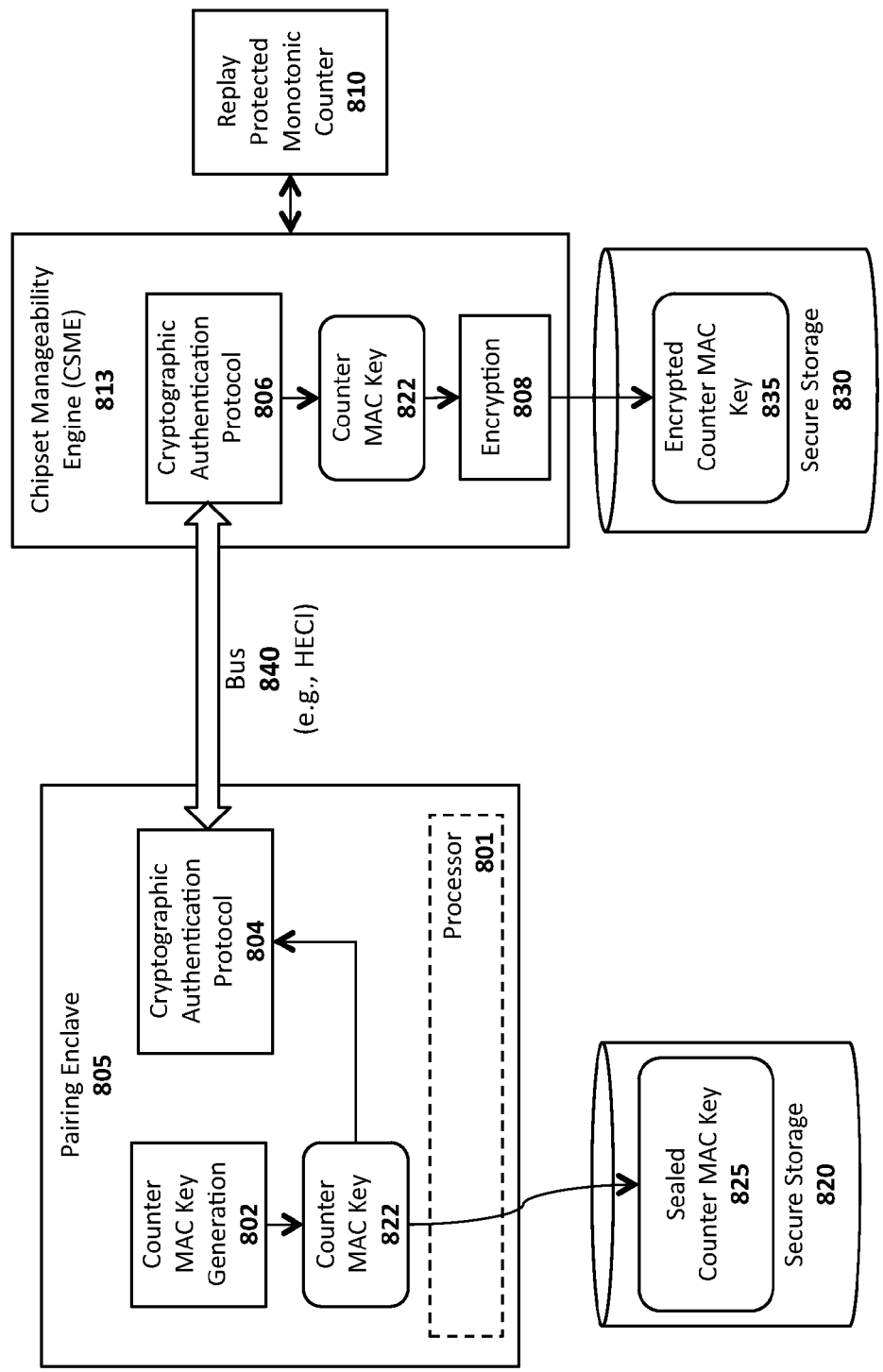
FIG. 8 illustrates one embodiment of the invention for pairing a processor with one or more other computing components.

FIG. 8 illustrates one embodiment of a system architecture which includes a pairing enclave 805 executed on a processor 801 and a chipset manageability engine (CSME) 813 which operate together to securely share a counter message authentication code (MAC) key 822. In one embodiment, counter MAC key generation logic 802 in the pairing enclave 805 randomly generates the counter MAC key 822. For example, it may generate the counter MAC key 822 using a digital random number generator (DRNG) provided by the processor 801. However, the underlying principles of the invention are not limited to a randomly-generated key or any particular mechanism for generating a random number. The principles are also not limited to generating the counter MAC key on the computing platform. For example, in one embodiment, the counter MAC key is generated elsewhere, such as on a server, and then delivered to Pairing Enclave 805.

In one embodiment, the counter MAC key 822 is sealed (e.g., encrypted using a secret known only by the processor 801) and the sealed counter MAC key 825 is then stored within secure storage 820 accessible by the processor 801. In addition, in one embodiment, a copy of the counter MAC key 822 is transmitted over a bus 840 to the CSME 813. In one embodiment, cryptographic authentication protocol modules 804 and 806 in the pairing enclave 805 and CSME 813, respectively, establish a secure communication channel over the bus 840 (which, as indicated, may be an insecure bus such as a host embedded controller interface (HECI) bus). In one embodiment, the cryptographic authentication protocol comprises an Enhanced Privacy ID (EPID)-based key exchange protocol such as direct anonymous attestation (DAA) SIGMA protocol (as specified by ISO 20009-2). However, the underlying principles of the invention are not limited to any particular cryptographic authentication protocol. In one embodiment, once received, encryption logic 808 in the CSME encrypts the counter MAC key 822 and stores the encrypted counter MAC key 835 in secure storage 830.

In one embodiment, a single physical secure storage device is used to implement both secure storage 830 and secure storage 820 shown in FIG. 8. For example, both secure storages 820, 830 may be implemented by a Flash memory device integrated on the computing platform which may be used to store other information such as the computing system BIOS, chipset images, etc. In this embodiment, the sealed counter MAC key 825 may be securely transmitted over the bus 840 to the CSME 813, which may then store the sealed counter MAC key 825 in the secure storage 830 on behalf of the processor 801. The underlying principles of the invention are not limited to any particular type of storage device or mechanism for storing the sealed counter MAC key 825 and encrypted counter MAC key 835.

FIG. 8 illustrates a direct connection between the pairing enclave 805 and the CSME 813. In an alternate embodiment, one or more intermediate modules may be used to establish the secure connection over the bus 840. For example, in one embodiment, the CSME establishes a first secure connection with a platform services enclave (PSE) (not shown), which then establishes a second secure connection with the pairing enclave 805 (and potentially one or more other secure enclaves). In one embodiment, the PSE and CSME establish a secure connection using an EPID-based pairing as discussed above (e.g., using the DAA SIGMA protocol) and the PSE and pairing enclave establish a secure connection using EREPORT-based authentication. Specifically, the pairing enclave may execute the SGX instruction ERPORT to create a cryptographic report which it then transmits to authenticate with the PSE. However, as previously mentioned, the underlying principles of the invention are not limited to any particular techniques for establishing the secure connection between the pairing enclave and CSME.

In one embodiment, the CSME 813 includes or is provided secure access to a replay protected monotonic counter (RPMC) 810. In one embodiment, the RPMC 810 serves as a version counter where, upon entering into a resume (or suspend) state, the processor (or software executing on the processor) sends an INCREMENT command to the CSME 813 which causes the counter to increment. Upon restoring the suspended processor state during a resume operation, the counter value stored with the suspended processor state (which may be different from the current processor state) is compared against the current counter value provided from the CSME 813 (retrieved from the RPMC 810). If the values match, then the suspended processor state is successfully restored (assuming that other security checks discussed below are also passed). In one embodiment, the RPMC 810 is implemented in a secure Flash memory, which may (or may not) be the same Flash memory used for secure storage 820 and 830. Additional details related to the RPMC 810 are provided below.

As mentioned above, in one embodiment, each pairing between processors and other system components is provided with an identity that is bound cryptographically to these devices. This identity is referred to herein as a "Pairing ID," which is computed as a cryptographic hash or MAC of the MAC Key 822. During manufacturing, the Pairing ID in each platform may be registered in a database. Only platforms with a registered pairing are recognized and will have attestation keys provisioned.

Figure 9:
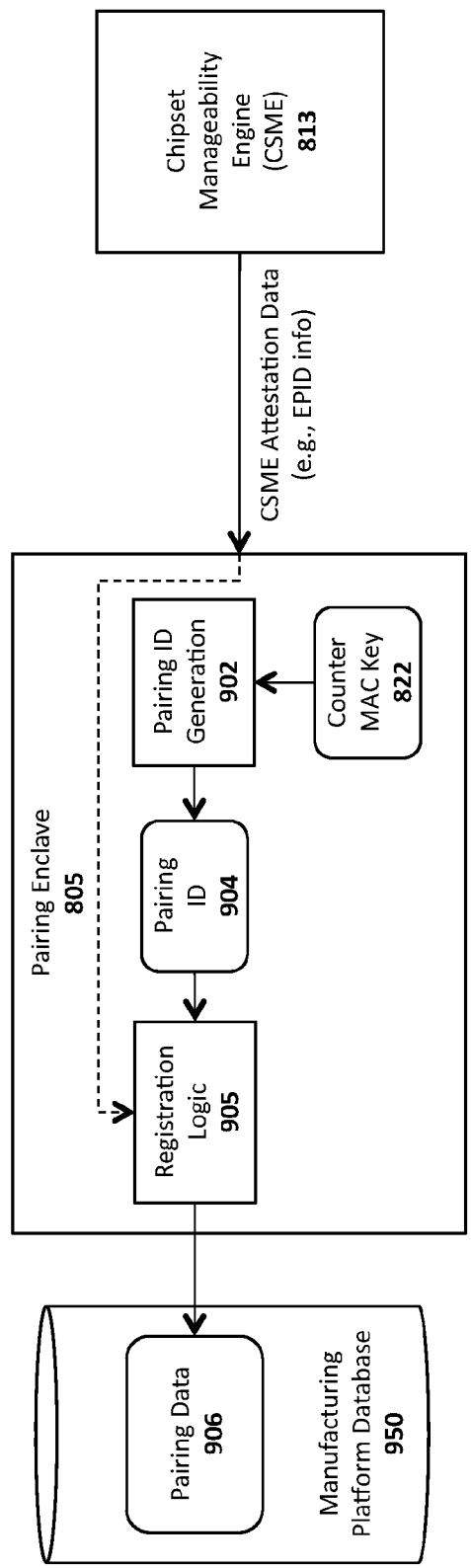
FIG. 9 illustrates one embodiment in which a pairing data is collected and stored within a database.

FIG. 9 illustrates one embodiment in which pairing ID generation logic 902 in the pairing enclave 805 generates a Pairing ID 904 using the counter MAC key 822. In one embodiment, this is accomplished using a private key to generate the hash or MAC over the counter MAC key 822. The resulting pairing ID 904 comprises a non-sensitive version of the counter MAC key 822. That is, the pairing ID 904 is a unique code based on the unique counter MAC key 822 but the counter MAC key 822 is kept secret and cannot be derived from the pairing ID 904.

In one embodiment, additional pairing data may be collected by the pairing enclave and used for registration. This may include, for example, attestation data related to the CSME 813 such as an Enhanced Privacy ID (EPID) assigned to the CSME. EPID is a digital signature scheme in which one group public key corresponds to multiple private keys, one of which may be assigned to the CSMA. Each unique EPID private key can be used to generate a signature which may then be verified using the group public key. Thus, if EPIDs are used, the EPID info may be collected and used for registration. Various additional data may be used for registration such as measurements of the pairing enclave 805 (e.g., configuration data or identity data unique to the pairing enclave 805).

In one embodiment, registration logic 905 in the pairing enclave 805 registers the pairing ID and any other pairing data 906 (e.g., the EPID info described above) in a manufacturing platform database 950. The manufacturing platform database 950 may then be accessed to ensure that the pairing between the processor and other components remains consistent. If a change is detected (e.g., a new/unpaired component is introduced into the system), then in one embodiment, attestation keys (e.g., SGX keys) will not be provisioned and/or will be made unavailable.

Figure 10:
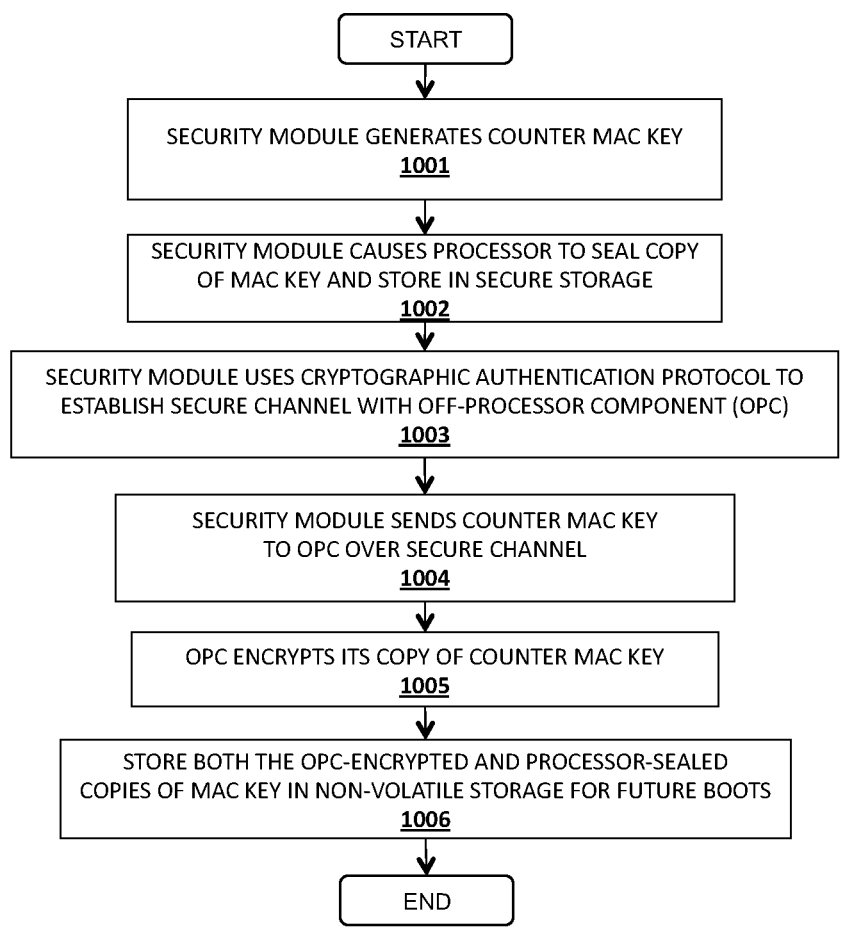
FIG. 10 illustrates a one embodiment of a method for generating a message authentication code (MAC) key.

FIG. 10 illustrates one embodiment of a method for pairing and registering components of a computing system. The method may be implemented within the context of the systems shown in FIGS. 8-9, but is not limited to any particular system implementation.

At 1001, a security module (e.g., the pairing enclave 805 in one embodiment) generates the counter MAC key (sometimes simply referred to herein as the "MAC key"). For example, as mentioned, it may generate the counter MAC key 822 using a digital random number generator (DRNG) provided on the computing platform.

At 1002, the security module seals the counter MAC key and stores the sealed MAC key in secure storage. "Sealing," in one embodiment, means encrypting the MAC key using a secret key known only by the entity which performs the seal operation (e.g., the processor), and in a manner which can only be decrypted by that entity.

At 1003, the security module implements a cryptographic authentication protocol to establish a secure communication channel with an off-processor component. In certain embodiments discussed herein, the off-processor component is the chipset manageability engine (CSME). Any secure communication protocol may be used to establish the secure connection. For example, as mentioned, the cryptographic authentication protocol may comprise an Enhanced Privacy ID (EPID)-based key exchange protocol such as direct anonymous attestation (DAA) SIGMA protocol (as specified by ISO 20009-2). However, the underlying principles of the invention are not limited to any particular cryptographic authentication protocol.

At 1004, once a secure channel is established, the security module sends the counter MAC key to the off-processor component (OPC) and, at 1005, the OPC encrypts its copy of the counter MAC key. At 1006, both the OPC-encrypted and processor-sealed copies of the counter MAC key are stored in secure non-volatile storage for future suspend/resume operations. As mentioned, the processor may utilize a separate secure storage from the off-processor component, or both the processor and off-processor component may use the same secure storage (e.g., secure Flash). In the latter case, the processor sends its sealed copy of the counter MAC key to the off-processor component, which performs the storage operation. In the former case, the processor saves its copy of the counter MAC key to its secure storage.

Figure 11:
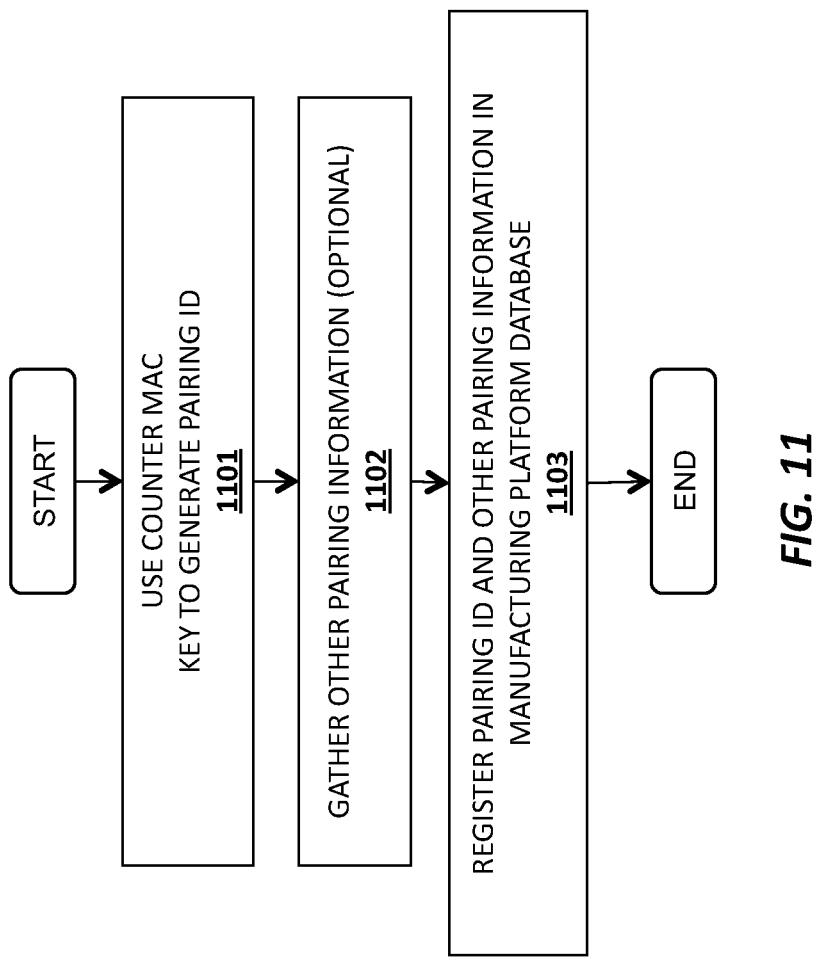
FIG. 11 illustrates one embodiment of a method for generating pairing data.

FIG. 11 illustrates one embodiment of a method for registering components of a computing system. The method may be implemented within the context of the systems shown in FIGS. 8-9, but is not limited to any particular system implementation.

At 1101, the counter MAC key is used to generate a pairing ID. For example, in one embodiment, this is accomplished by the security module, which performs a cryptographic hash or MAC of the counter MAC key (e.g., using a secret key).

At 1102, other pairing information is optionally gathered. This information may include, for example, attestation data related to the off-processor component such as an Enhanced Privacy ID (EPID). In addition, as mentioned, information related to the security module may also be used for registration.

At 1103, the pairing ID is registered in a manufacturing platform database, potentially along with other pairing. The manufacturing platform database may then be accessed to ensure that the pairing between the processor and other components remains consistent. If a change is detected (e.g., a new/unpaired component is introduced into the system), then in one embodiment, attestation keys (e.g., SGX keys) will not be provisioned and/or will be made unavailable.

Figure 12:
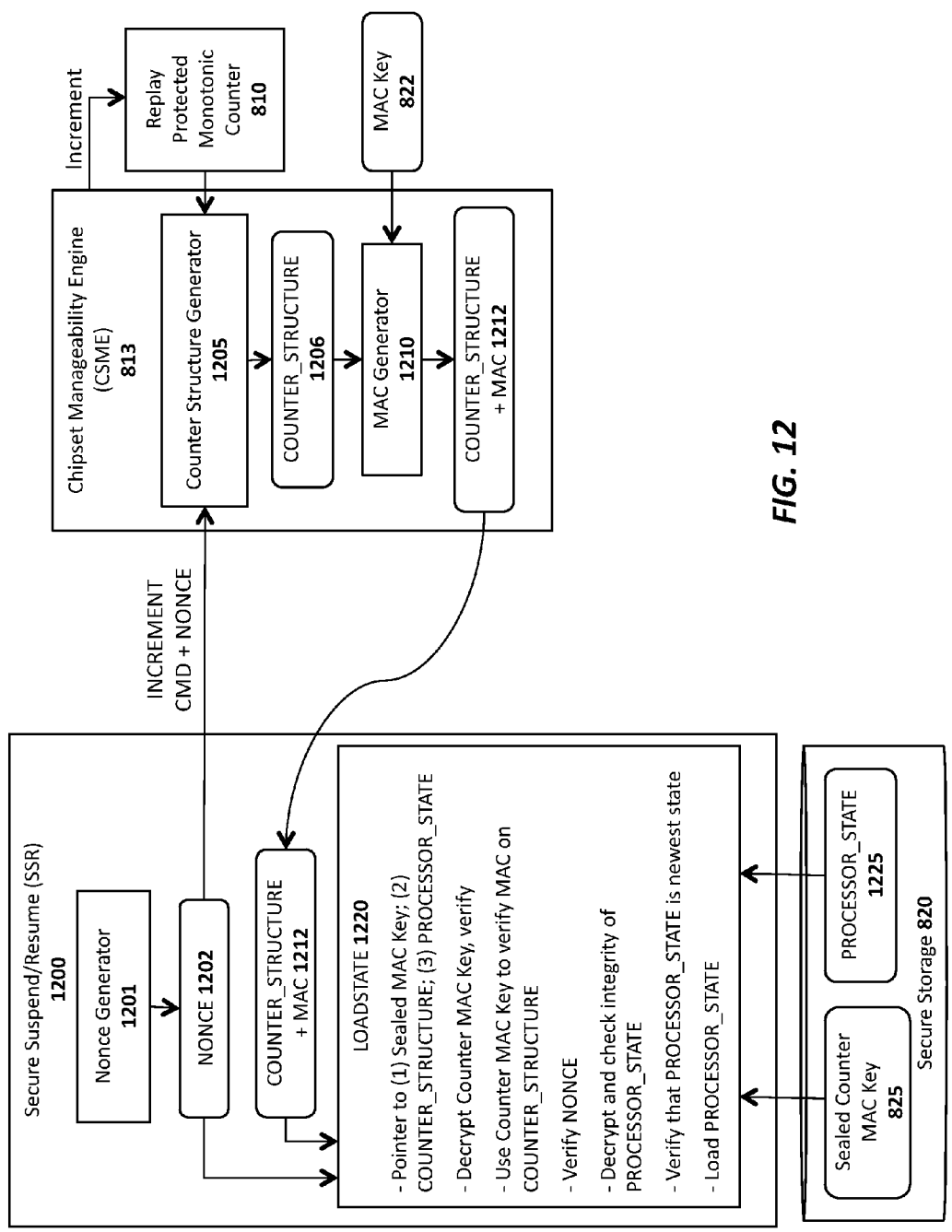
FIG. 12 illustrates techniques for securely restoring a processor state using a counter value.

FIG. 12 illustrates a sequence of operations and architecture employed in one embodiment of the invention during a resume operation (e.g., when the system is waking from a suspended state). In the particular embodiment shown in FIG. 12, a secure suspend/resume (SSR) module 1200 causes the processor (not shown) to execute a series of operations in combination with a chipset manageability engine (CSME) 813 to ensure that a valid processor state is loaded.

A nonce generator 1201, which may comprise a GETSNONCE instruction, is executed to generate a cryptographic nonce 1202. As understood by those of skill in the art a cryptographic nonce is an arbitrary number used only once during cryptographic communication. The SSR module 1200 then transmits the nonce 1202 with an INCREMENT command to the CSME 813. In one embodiment, the INCREMENT command and nonce are transmitted over an insecure bus (e.g., an HECI bus). In another embodiment, the SSR 1200 may implement a cryptographic authentication protocol with the CSME 813 to establish a secure communication channel over the bus.

In response to the INCREMENT command, the CSME causes the RPMC 810 to increment. In one embodiment, a counter structure generator 1205 generates a COUNTER_STRUCTURE 1206 including the nonce and the current counter value read from the RPMC 810. In one embodiment a MAC generation module 1210 generates a MAC (or other hash operation) over the COUNTER_STRUCTURE using the MAC key 822. The resulting COUNTER_STRUCTURE and MAC 1212 are then transmitted back to the SSR module 1200, as illustrated.

The SSR 1200 then executes a LOADSTATE instruction 1220 which includes a pointer to: (1) the SEALED_COUNTER_MAC_KEY structure 825 created by the pairing enclave (see FIGS. 8 and 10 and associated text); (2) the COUNTER_STRUCTURE 1206 returned by the CSME 813; and (3) the PROCESSOR_STATE 1225 which includes the previous internal processor state values (prior to the suspend operation) and the correct counter.

In one embodiment, the LOADSTATE instruction decrypts the counter MAC key 825, verifying that it was created on this processor. It uses the counter MAC key 825 to verify the MAC generated on the COUNTER_STRUCTURE by the CSME 813. It verifies that the nonce in the COUNTER_STRUCTURE is the same that was provided by the nonce generator 1201. It then decrypts and checks the integrity of the PROCESSOR_STATE 1225. Finally, it verifies that the PROCESSOR_STATE 1225 is the newest state by verifying that the current counter in the COUNTER_STRUCTURE 1206 is the same as the counter in the PROCESSOR_STATE 1225. If they match, then this is the newest state. If all security checks pass, then the PROCESSOR_STATE is loaded and executed.

Figure 13:
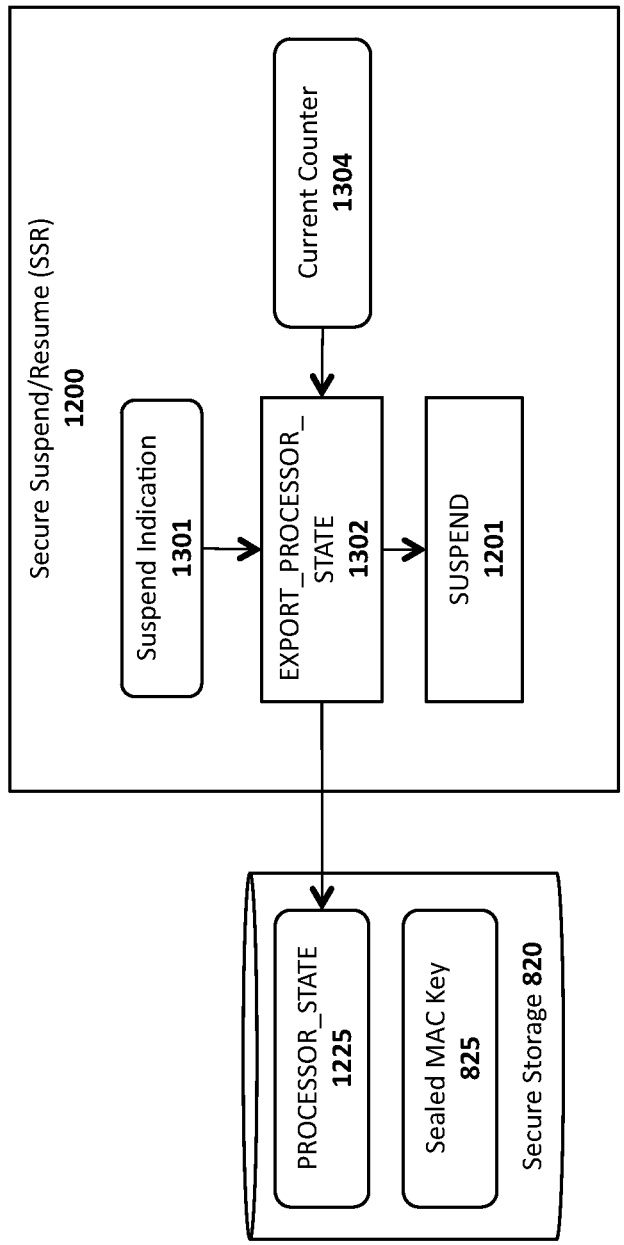
FIG. 13 illustrates techniques for securely suspending a processor state using a counter value.

FIG. 13 illustrates a sequence of operations which may be performed by the SSR module 1200 when a processor is suspended (e.g., enters into an S3 or S4 state as defined by the Advanced Configuration and Power Interface (ACPI) specification). In response to a suspend indication 1301, an EXPORT PROCESSOR_STATE instruction 1302 is executed. In one embodiment, the EXPORT_PROCESSOR_STATE instruction 1302 exports a new PROCESSOR_STATE structure 1225 that contains the current processor state and the next counter value 1304, which is the counter the next boot will expect. The current processor state may include any state information such as the architectural state of the processor, paging key data used by Software Guard Extensions (SGX) (e.g., paging crypto metadata (PCMD)), or any other data needed to successfully resume operation of the computing system. If an additional resume and suspend is performed, this counter will be less than the current one, and will be detected as an old PROCESSOR_STATE. In one embodiment, following the export of the PROCESSOR_STATE structure 1225, the operating system powers down and the system enters a suspended state (e.g., an S3 or S4 state).

In one embodiment, all keys used by the system must be bound to the pairing of system components and must be changed after any re-pairing event. This is important to prevent exposing the keys to a maliciously-initiated pairing that may use untrustworthy hardware. To accomplish the binding between all keys and the pairing, in one embodiment, the pairing ID 904 is injected into all keys.

If the pairing environment is more secure than the runtime boot environment, the pairing ID 904 may be added after the secure key is derived, such as by using the following:
SuspendableKey=CMAC(PairingEnvironmentKey, PairingID)

Figure 14:
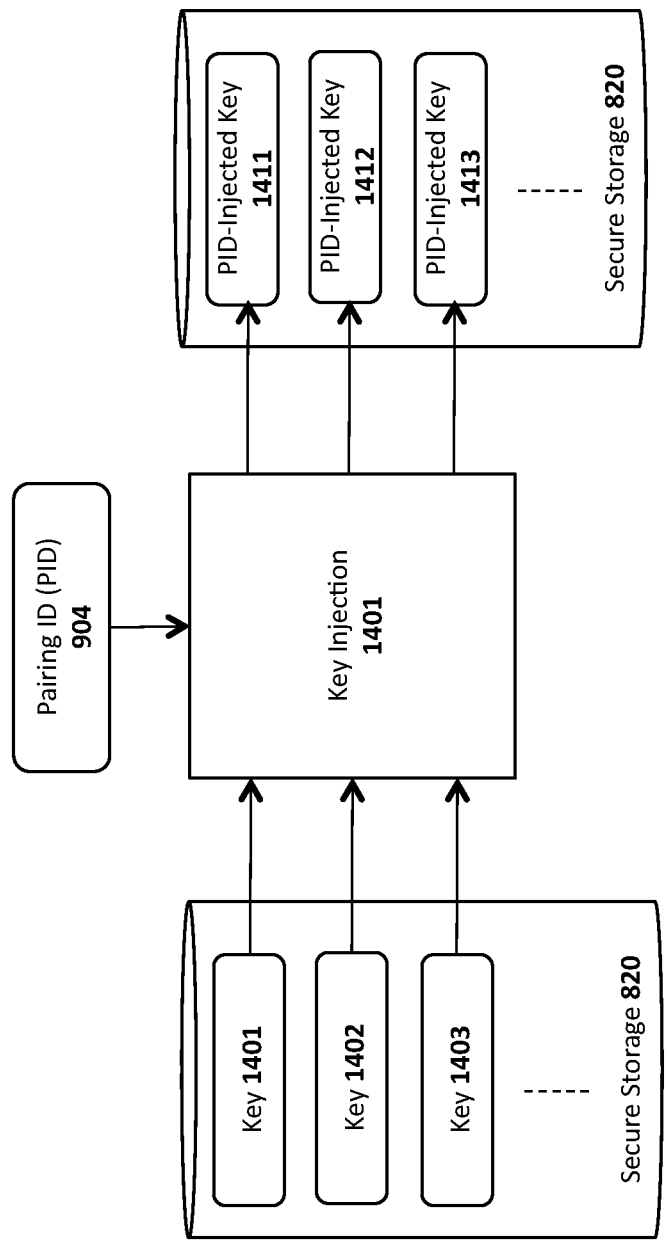
FIG. 14 illustrates how a pairing ID may be injected into existing keys in accordance with one embodiment of the invention.

FIG. 14 illustrates one embodiment in which key injection module 1401 injects the pairing ID 904 into each of a set of existing keys 1401-1403, resulting in PID-injected keys 1411-1413. In one embodiment, the key injection module 1401 computes the runtime PID-injected keys 1411-1413 by generating a hash over the keys 1401-1403 and the pairing ID 904 using the counter MAC key 822. In one embodiment, the key injection module 1401 is executed during the pairing environment, and has its data available in the runtime environment. It acquires the keys 1401-1403 using the GETKEY instruction (e.g., to acquire each secure PairingEnvironmentKey). It then computes the runtime keys 1411-1413 available in the suspendable environment by performing the counter MAC key operation on the keys returned by the instruction and the pairing ID 904.

By using trusted software as described above, a secure authenticated key exchange can be conducted between the components in a computing system, which is too complex for the processor logic to support itself. This allows the pairing to take place in an insecure manufacturing facility. Moreover, the system can reuse an existing, multipurpose bus (e.g., an HECI bus) to securely read the value of the counter from the CSME 813 without any storage on the processor. The system supports refurbishing without compromising security, because re-pairing with malicious hardware destroys all of the keys. When done in an authorized environment, the environment can register the new pairing with provisioning services to get new keys provisioned to the platform, restoring it to a trustworthy state.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
    generating a first key, wherein the first key comprises a message authentication code (MAC) key;
    securely sharing the first key with an off-processor component in a computer system that comprises a processor, wherein the off-processor component comprises a microcontroller that controls a counter;
    using the first key to generate a pairing identity (ID) for identifying a pairing between the processor and the off-processor component using the pairing ID;
    injecting the pairing ID into one or more other keys used in the computer system;
    suspending the processor, wherein the suspension includes exporting a state of the processor into a storage including the one or more other keys that are injected the pairing ID; and
    resuming the processor, wherein the resumption includes loading the state of the processor based on the counter and the one or more other keys that are injected the pairing ID.

2. The method as in claim 1, further comprising:
    storing the pairing ID in a platform database; and
    subsequently querying the platform database to determine whether to provision attestation keys to the computer system containing the pairing.

3. The method as in claim 1 wherein the one or more other keys comprise security keys used for establishing secure enclaves on the computer system.

4. The method as in claim 1, wherein generating the first key comprises
    using a digital random number generator (DRNG) to generate a random number to be used for the first key.

5. The method as in claim 1, wherein injecting comprises using a second key to generate a message authentication code over both the pairing ID and the one or more other keys.

6. The method as in claim 1, wherein the first key is encrypted using a secret known only by the processor.

7. The method as in claim 6, wherein the encrypted first key is stored within the storage that is accessible by the processor.

8. The method as in claim 1, wherein generating the pairing ID is generated using a private key of the processor to generate a hash over the MAC key.

9. The method as in claim 1, wherein generating the pairing ID is generated using a private key of the processor to generate a message authentication code over the MAC key.

10. A computer system comprising:
    a processor;
    an off-processor component comprising a microcontroller that controls a counter;
    a storage; and logic that is configured to
  generate a first key, wherein the first key comprises a message authentication code (MAC) key,
  secure share the first key with the off-processor component,
  use the first key to generate a pairing identity (ID) for identifying a pairing between the processor and the off-processor component using the pairing ID,
  inject the pairing ID into one or more other keys used in the computer system,
  suspending the processor, wherein the suspension includes exporting a state of the processor into a storage including the one or more other keys that are injected the pairing ID, and
  resuming the processor, wherein the resumption includes loading the state of the processor based on the counter and the one or more other keys that are injected the pairing ID.

11. The computer system as in claim 10, further comprising:
  a platform database to store the pairing ID, wherein the logic is further to subsequently query the platform database to determine whether to provision attestation keys to the computer system containing the pairing.

12. The computer system as in claim 10, wherein the one or more other keys comprise security keys used for establishing secure enclaves on the computer system.

13. The computer system as in claim 10, wherein the generation of the first key is to use a digital random number generator (DRNG) to generate a random number to be used for the first key.

14. The computer system as in claim 10, wherein the injection is further to use a second key to generate a message authentication code over both the pairing ID and the one or more other keys.

15. The computer system as in claim 10, wherein the first key is encrypted using a secret known only by the processor.

16. The computer system as in claim 15, wherein the encrypted first key is stored within the storage that is accessible by the processor.

17. The computer system as in claim 10, wherein the generation of the pairing ID is to generate the pairing ID using a private key of the processor to generate a hash over the MAC key.

18. The computer system as in claim 10, wherein the generation of the pairing ID is to generate using a private key of the processor to generate a message authentication code over the MAC key.

* * * * *